US006970430B2

(12) United States Patent
Guven et al.

(10) Patent No.: US 6,970,430 B2
(45) Date of Patent: Nov. 29, 2005

(54) METHOD TO MEASURE THROUGHPUT EFFICIENCY OF LOW SPEED MODEM RELAY OVER PACKET NETWORK

(75) Inventors: Erhan Guven, Rockville, MD (US); Frank Edward Fruth, Gaithersburg, MD (US); Edward N. George, Germantown, MD (US)

(73) Assignee: Texas Instruments Incorporated, Dallas, TX (US)

(*) Notice: Subject to any disclaimer, the term of this patent is extended or adjusted under 35 U.S.C. 154(b) by 823 days.

(21) Appl. No.: 09/750,265

(22) Filed: Dec. 29, 2000

(65) Prior Publication Data

US 2002/0085501 A1 Jul. 4, 2002

(51) Int. Cl.[7] .............................. H04J 1/16; H04L 12/28
(52) U.S. Cl. ..................................... 370/252; 370/401
(58) Field of Search ............................... 370/351–356, 370/252, 242, 244, 401, 375, 522, 524; 11/11

(56) References Cited

U.S. PATENT DOCUMENTS

| 6,112,234 A * | 8/2000 | Leiper ..................... 709/219 |
| 6,434,169 B1 * | 8/2002 | Verreault .................. 370/522 |
| 6,515,963 B1 * | 2/2003 | Bechtolsheim et al. ..... 370/229 |
| 6,549,587 B1 * | 4/2003 | Li ............................. 375/326 |
| 6,574,213 B1 * | 6/2003 | Anandakumar et al. .... 370/349 |
| 6,665,317 B1 * | 12/2003 | Scott ......................... 370/516 |
| 6,678,250 B1 * | 1/2004 | Grabelsky et al. ......... 370/241 |
| 6,757,250 B1 * | 6/2004 | Fayad et al. ............. 370/235.1 |
| 6,757,367 B1 * | 6/2004 | Nicol ........................ 379/90.01 |
| 2003/0037158 A1 * | 2/2003 | Yano et al. ................ 709/232 |

* cited by examiner

Primary Examiner—John Pezzlo
Assistant Examiner—Saba Tsegaye
(74) Attorney, Agent, or Firm—Abdul Zindani; Wade James Brady, III; Frederick J. Telecky, Jr.

(57) ABSTRACT

Modem relay provides a local interface to the modem on both ends of a call, demodulates the full duplex data stream, packetizes the bits for transport over an IP network, and remodulates the data stream at the remote end. It is advantageous to measure the throughput efficiency of the modem relay. The modem relay provides bandwidth savings, and resistance to network packet loss. However, the resistence is often accomplished by redundancy techniques which can reduce effective throughput rates. Because the modem data stream can be transported in a redundant fashion, which allows for seamless error recovery in the event of single or double packet loss events, lost packet recovery minimizes computational requirements and provides for recovery of lost packets during burst loss of a series of sequential packets. The present invention teaches a system and method for determining the throughput of various modem relay implementations. Design parameters can be manipulated to effectuate desired implementations within the operational characteristics of a packet network.

15 Claims, 10 Drawing Sheets

MODEM RELAY PROTOCOL STATE PACKETS

| PROTOCOL STATE | DESCRIPTION |
|---|---|
| OFFLINE | IDLE STATE |
| CARRIER LOSS | SILENCE ON THE ANALOG LINE, CARRIER LOSS |
| HANDSHAKE | MODEM DATA PUMPS WILL BEGIN HANDSHAKING PROCESS |
| CONNECT | LOCAL HANDSHAKE SESSION IS PASSED AND READY FOR MODEM RELAY |
| RELAY | MODEM RELAY TAKES PLACE |

MODEM HANDSHAKE STATE PACKETS

| HANDSHAKE STATE | DESCRIPTION |
|---|---|
| V25 | V.25 ANSWER TONE IS DETECTED ON THE LOCAL ANALOG LINE |
| V25PR | V.25 ANSWER TONE WITH PHASE REVERSALS IS DETECTED ON THE LOCAL ANALOG LINE |
| V21 | V.21 B1 SIGNAL IS DETECTED ON THE LOCAL ANALOG LINE |
| USB1 | V.22 USB1 SIGNAL IS DETECTED ON THE LOCAL ANALOG LINE |
| S1 | V.22bis S1 SIGNAL IS DETECTED ON THE LOCAL ANALOG LINE |
| SB1_1200 | V.22bis SB1 SIGNAL @ 1200 IS DETECTED ON THE LOCAL ANALOG LINE |
| SB1_2400 | V.22bis SB1 SIGNAL @ 2400 IS DETECTED ON THE LOCAL ANALOG LINE |

MODEM DATA PACKETS

| DATA TYPE | DESCRIPTION |
|---|---|
| V21 | V.21 DATA @ 300 bps |
| V22 | V.22 DATA @ 1200 bps |
| V22BIS | V.22bis DATA @ 2400bps |

FIG. 12

METHOD TO MEASURE THROUGHPUT EFFICIENCY OF LOW SPEED MODEM RELAY OVER PACKET NETWORK

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to modem transmission over packet networks. In particular, the present invention relates to techniques for demodulating, relaying, and remodulating low speed (eg. V.22, V.22bis and V.21) modem transmissions over packet networks.

When modem devices are connected through a packet network, they are not directly connected. The entire modem signal is packetized at a sending end, sent over the packet network and reassembled into a designated format at the receiving end before presentation to the receiving modem device.

For example, packetizing and transporting of modem calls over gateway platforms using G.711 (PCM) codec, requires digitizing the originating modem phone line at 64 Kbps, packetizing and transporting the entire 64 kbps data stream to the other side, and then sending out the same 64 kbps data stream to the remote modem. The advantage of this approach is that it works for any modem that can be received on a standard POTS phone line, and it is simple to implement.

The disadvantage of this approach are:

(1) it requires a large amount of network bandwidth to implement the call and a connection can be dropped because of packet loss. If G.711 packets are being sent every 10 mSec, then the network bandwidth required to send each direction of the call is over 110 kbps (when the header sizes (RTP+UDP+IP+TCP+Ethernet) are included).

(2) The connection over a packet network is not a constant connection and often experiences line delays, errors, jitter and/or packet loss which can result in modem errors. In particular, packet loss results in interruptions in the modem signal (intermittent carrier loss) at the receiving modem. The interruptions result in degraded data throughput due to modem retrains and increased modem connection failures.

(3) Due to the clock differences at the two end points, standard G.711 playout techniques will periodically exhibit a modem signal interruption due to playout overruns and/or underruns. Again these interruptions in the modem signal lead to periodic modem retrains impacting data throughput rates.

In summary, when G.711 coding with packetization is used for data modem transmissions, the two modems are essentially communicating to each other using a potentially inadequate medium for their transmission. This approach is particularly vulnerable to network packet loss.

SUMMARY OF THE INVENTION

The modem relay of the present invention allows for the capability to demodulate, relay, and remodulate modem transmissions over packet networks.

The modem relay provides a local interface to the modem on both ends of the call, demodulates the full duplex data stream, packetizes the bits for transport over an IP network, and remodulates the data stream at the remote end. The modem relay provides bandwidth savings, and improved performance (data throughput and connection reliability) in a packet loss environment.

The modem relay mitigates the problems associated with using G.711 to send modem traffic. In modem relay, the physical layer or link layer of the modem signal is terminated locally for both ends of the call. Only the demodulated data stream is sent over the network. This leads to dramatic bandwidth savings. For a V.34 modem, in an exemplary embodiment, the 64 kbps phone line is demodulated into a maximum of 33,600 bps data stream. That data stream is packetized and transported with a network bandwidth of less than 20 kbps (for 30 mSec packets).

Since the physical layer is terminated locally, network packet loss will not result in any interruption in the modem signal at the receiving modem. Therefore this approach will eliminate connection failures due to the network packet loss. Instead a packet loss will result in an error in the information data stream.

Bandwidth savings are also realized using Modem Relay in that data is carried over the IP network only as the modem transmits data. When the modem is not transmitting data, no packets are sent on the IP network. In contrast, continuous 64 kbps packetization takes place when using G.711 to carry modem traffic. Depending on the network transport, the modem data is sent over the packet network using a guaranteed delivery mechanism (link layer termination) or sent using a non-guaranteed delivery mechanism (physical layer termination). In the case of a non-guaranteed delivery mechanism, data redundancy techniques can be used to combat packet loss and improve data throughput.

BRIEF DESCRIPTION OF THE DRAWINGS

For a better understanding of the nature of the present invention, reference is had to the following figures and detailed description, wherein like elements are accorded like reference numerals, and wherein:

FIG. 12 illustrates the modem relay protocol state packets, modem handshake state packets and modem data packets.

DETAILED DESCRIPTION OF PREFERRED EXEMPLARY EMBODIMENTS

The modem relay for V.22bis modems and below occurs at the physical layer. The modem's physical layer is demodulated into a bitstream and that bitstream is relayed end-to-end across the network. Any higher layer protocols (error correction, compensation) that may be present are passed end-to-end across the network.

Figure 1:
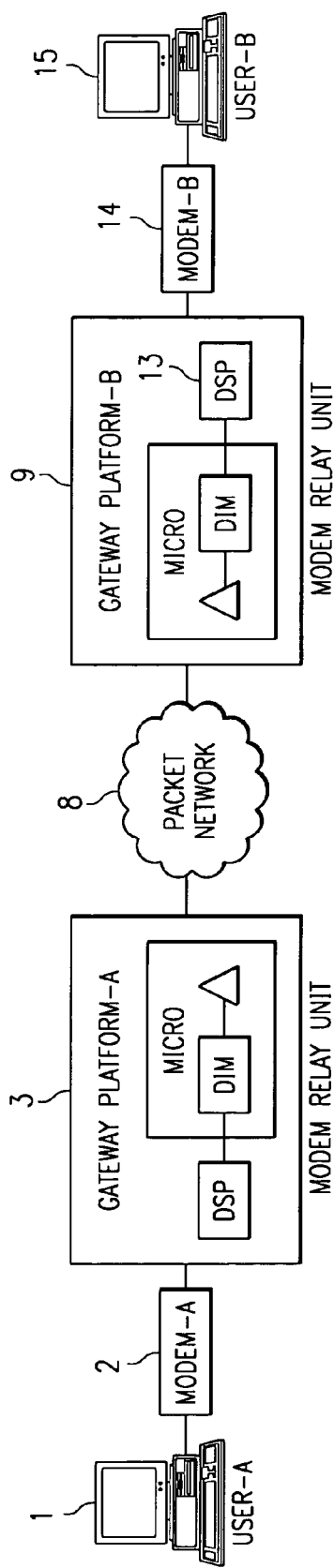
FIG. 1 is a diagram illustrating the components of a modem relay configuration.
Figure 2:
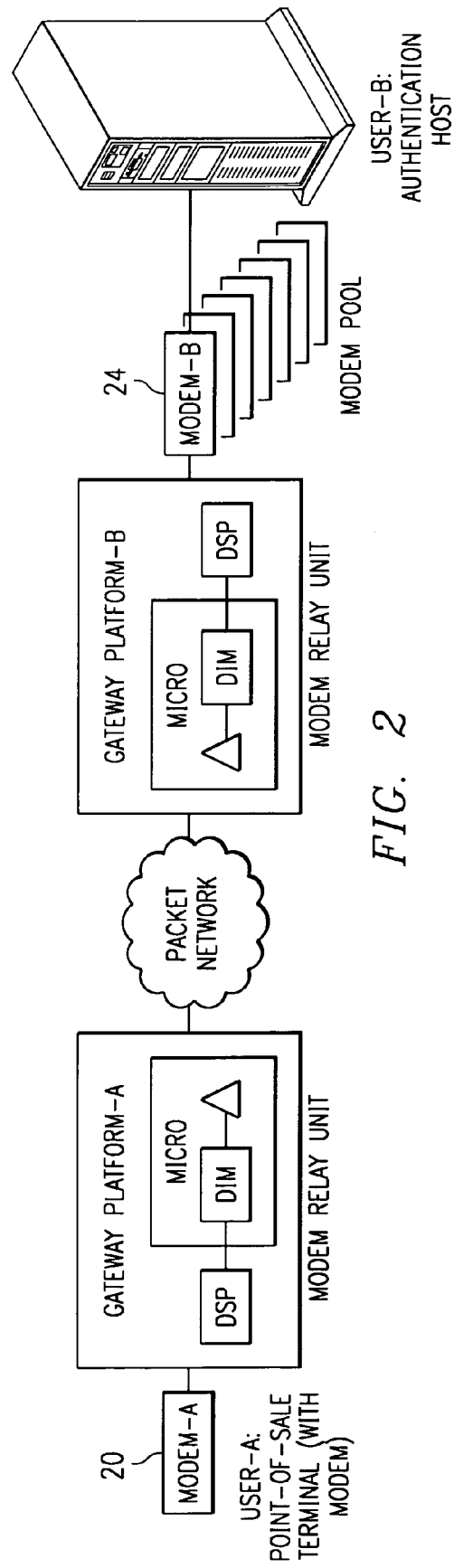
FIG. 2 is a diagram illustrating a point-of-sale implementation of the present invention.

A typical modem relay system configuration is illustrated in FIG. 1. For lower speed modems, a typical end-user application is in point-of-sale terminals used to implement credit card validation. FIG. 2 illustrates a point-of-sale implementation using modem relay.

The steps in setting up a modem relay connection are:

1) A first user, initiates a modem call using a dial-up modem, such as modem 2 attached to a personal computer 1 or in a point-of-sale terminal 20, at the first end of the connection.

2) Modem 2, enters an off-hook state, dials and waits for the far end modem 14 to answer.

3) The first gateway 3 detects the line seizure, opens a DSP voice channel and collects DTMF digits.

4) The first gateway 3 translates the dial number and attempts to perform a call setup to the far end gateway 9 which is located at a remote point in the network.

5) Gateway 9 detects the incoming call setup from gateway 3 over the packet network 8. The gateway 9 accepts the incoming call and opens a DSP voice channel to handle the incoming call. Next, gateway 9 seizes the outgoing line.

6) For modem relay, the outgoing line connects to modem 14 at the far end which may be connected to a personal computer 15 or may be a modem in a modem pool 24. Modem 14 goes off-hook and plays a modem answer sequence (eg. V.25 ANS tone).

7) Gateway 3 detects the modems answer sequence (as described below) and switches the DSP over from a voice channel to a modem relay channel. Then gateway 9 sends the switch over message to gateway 3 in the form of a modem relay message packet. Gateway 9 also continues to negotiate with far end modem 14 to establish a data connection to PC 15.

8) Gateway 3 switches its channel to modem relay and begins to negotiate channel setup with modem 2.

9) During the negotiations, control messages are exchanged between gateway 3 and gateway 9 to coordinate the compression format used on both sides of the link and to establish the gateway to gateway LAPM link. At the end of the negotiation, both modems have connected with their respective local gateway at the best possible connection rate using V.42 LAPM and the same type of compression. Further, the modems on both sides have transitioned into data mode and are ready to begin sending or receiving data.

10) Modem 2 and modem 14 now begin sending data back and forth across the packet network 8. Each gateway unit demodulates the modem transmissions, packetizes the data and sends it to the far side. The gateway on the far side remodulates the modem data and sends it to the far end modem. Throughout the connection, flow control is performed on each segment of the link to regulate the error free transmission of data.

11) The connection continues until one of the modems hangs up. At that point, the call is terminated on both sides and the channels then return to idle.

Throughout a modem relay call, the state machines in the modem relay unit periodically send line status updates to make sure that both modems remained in sync with each other.

Figure 3:
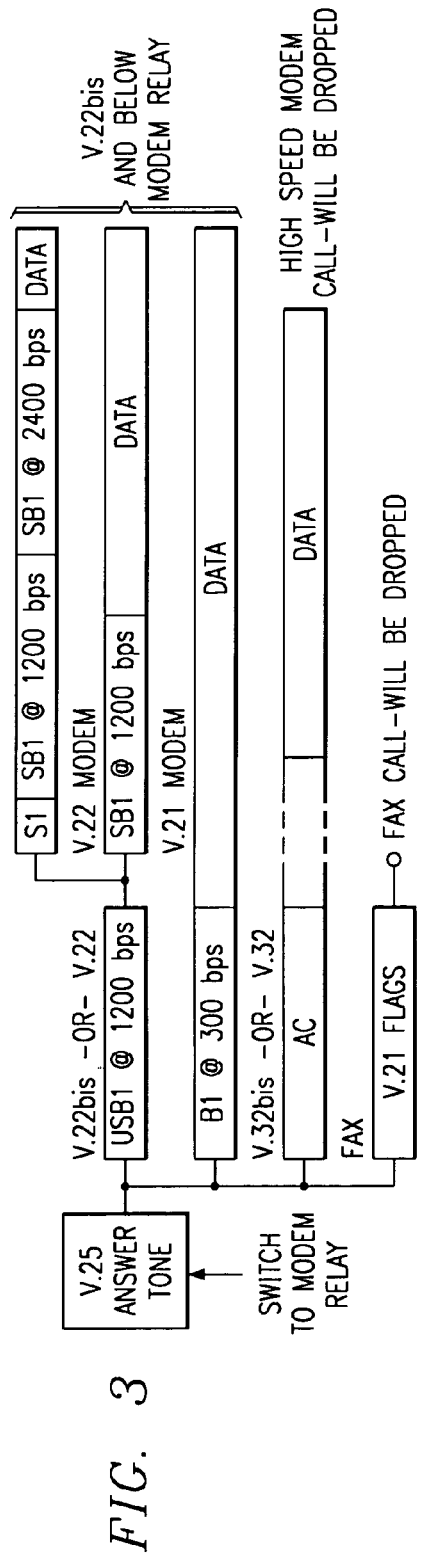
FIG. 3 is a flow decision diagram illustrating the decision sequence for determining the modulation and connection speed.

The operation of modem relay is driven by events that occur when gateway 9 seizes its outgoing line and places a call to modem 14. Initially gateway 9 does not know that the call is a modem call, and begins by using a voice processing configuration in the DSP 13. When modem 14 answers, it begins play out of a V.25 answered tone (ANS), as illustrated in FIG. 3.

When modem relay is enabled, gateway 9 switches to the low speed modem relay DSP code after it detects the V.25 answered tone, and proceeds to monitor the incoming sequence from modem 14. Gateway 9 attempts to establish a V.22bis, V.22 or V.21 data connection. Depending on the type of modem on the line, the decision sequence illustrated in FIG. 3 is executed to determine the modulation and speed for the connection. If a fax signal is detected, the modem relay code sends a message to the microprocessor code to perform a switch to fax relay.

At each stage of the negotiation process, gateway 9 will be sending signaling messages across the network to gateway 3. Because there is no guaranteed method of flow control between lower speed modems, both sides of the connection must be trained to operate at the same modulation and rate. Therefore, signaling messages are used to determine if the capabilities of the two modems can support an optimal connection. If there is a capability overlap, the best commonly supported data rate will be selected at both sides. If there is no modulation and rate common to modem 2 and modem 14, then the call will be a connected independently at both sides. These "uneven" connections work, but not as efficiently as connections that support the same data rate at both ends.

For V.32 modems and above, V.42 error correction is frequently used to provide link layer connectivity and error correction between the two modem and points. For V.22bis modems and below, V.42 error correction may or may not be present in the connection.

For V.22bis modems and below, if V.42 is present, it is handled transparently by passing error correction end-to-end over the network. Therefore, both modems have to be synchronized at the start of the call to use the same modulation and data rate. Then, V.42 and other high layer protocols are simply ignored by the modem relay software. This approach will work provided that network end-to-end delays do not exceed one second. If the network delay exceeds one second, then the modems will be able to connect to each other but not be able to establish LAPM protocols across the link, which will increase the error rate and prevent data compression (V.42 bis) for the modem session.

There is currently no network protocol standard defining the call control or data transmission protocol for modem relay over packet networks. Therefore, a proprietary approach is utilized by the present invention to implement modem relay. However, the present invention can be implemented with a standard protocol without departing from the scope of the inventive concepts taught herein. The protocol is similar to the proprietary fax relay protocol disclosed in co-pending application Ser. No. 09/031,047. The modem relay protocol used accommodates encapsulation using the RTP format for transmission across the network.

The modem relay protocol has the following features:

Redundant Signaling Messages—There are two types of signaling messages: call control and modem control signaling. Once a modem call is established, the only call control message that is expected is a termination event. Modem control messages including events like forced retraining or carrier loss events. All of the signaling messages between the two gateway units 3 and 9, are sent periodically throughout the call by the modem relay unit. They are sent more rapidly during call setup and negotiation. A signaling message is contained in a single modem relay packet, which conveys the current state of the call. If the network drops any one signaling packet, another packet will be sent soon so that the call can still proceed normally. If there is a network outage during a modem call that interrupt the packet flow between modem relay units, each side of the connection will perform a clear down on its part of the call.

Redundant data. Instead of sending the same packet several times, data redundancy is achieved by appending data from previous packets in the payload section of the current data packet. Then, the receiving gateway uses the packet sequence number to determine if there has been a packet loss. If no packet loss occurred, it uses the most recent data field in the packet. If the receiving gateway detects that packet loss has occurred, the data fields for lost packets are retrieved by reading further down in the current packet. Data redundancy effectively increases the network bandwidth, though the actual data from the modem is a small part of the overall packet size. For instance, in a 2400 bps modem with a 10 mSec VIF size, the data size is 3 bytes and the header size is 48 bytes per network packet. Adding in additional 3 bite data fields will not increase the overall packet size by a significant amount based on a percentage of the total size. The amount of redundant data contained in each packet is configurable.

Retraining is also accommodated by the present invention. In the event that one of the modems in the connection experiences a loss of equalization on the line, it can initiate a retrain signal. When a gateway receives the retrain signal, it executes the retraining sequence locally and sends the retrain signal across the network to the other gateway. Both sides of the connection are negotiated to support the best case common rate.

Since the retraining and rate signaling events may not be supported by one of the modems in the connection, a potential system problem occurs when one side initiates a retrain. The significance of this problem will depend upon the modem capabilities. If both sides of the call cannot be read trained to the compatible rate, the call will be terminated and cleared.

Call discrimination is accomplished through processing in the DSP. When a call is connected, the gateway must determine what type of call processing is required to successfully implement the call: voice, fax relay, modem relay, or PCM. Individual channels can be pre-configured for a certain type of processing, but in general the gateway does not know in advance what type of devices are going to be involved in the call. The earlier it can distinguish the type of traffic involved in a call, the faster it can switch over to use the right set of processing resources.

Figure 4:
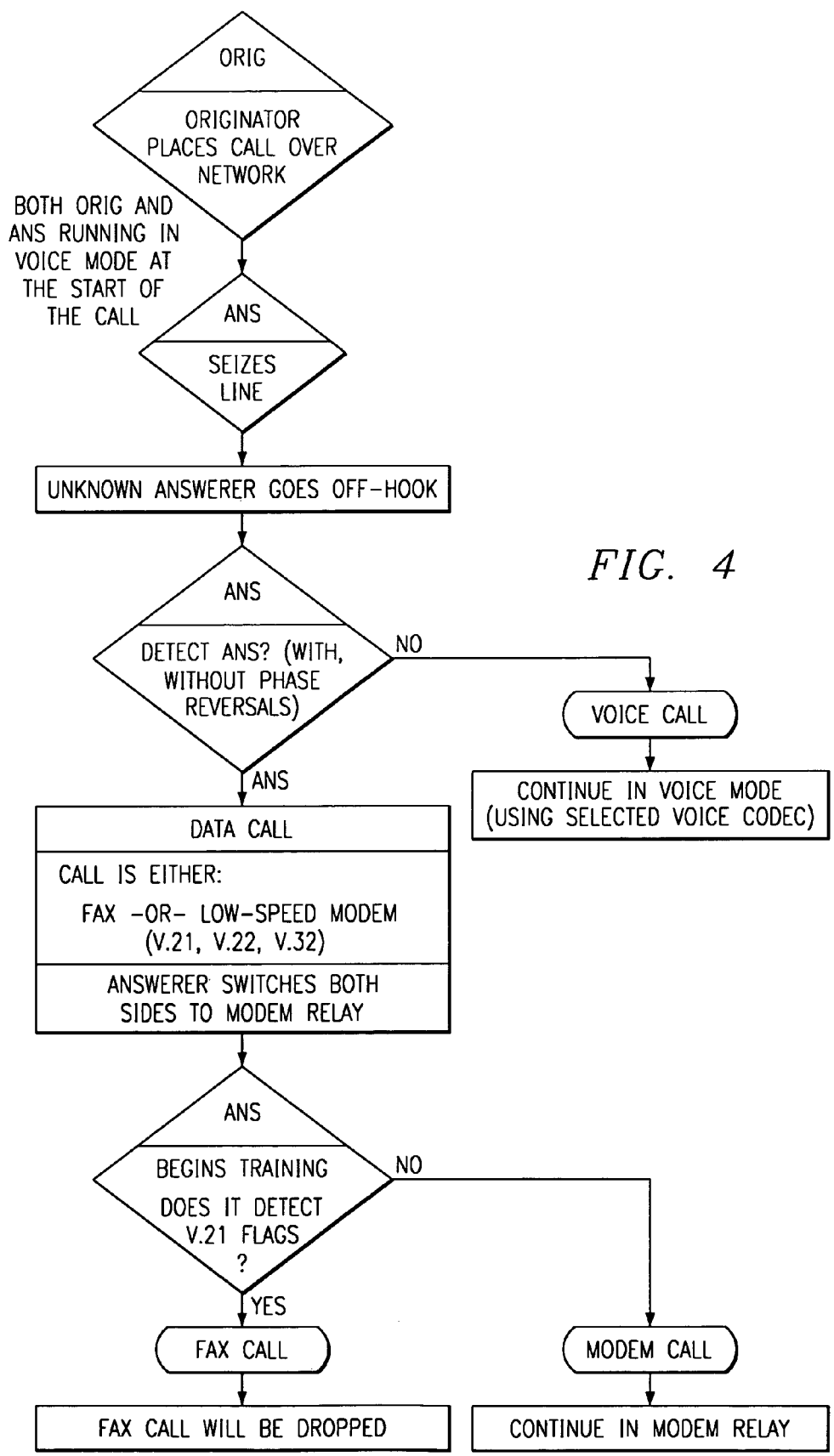
FIG. 4 is a logic diagram illustrating an exemplary logic structure for modem identification and modem relay activation.
Figure 5:
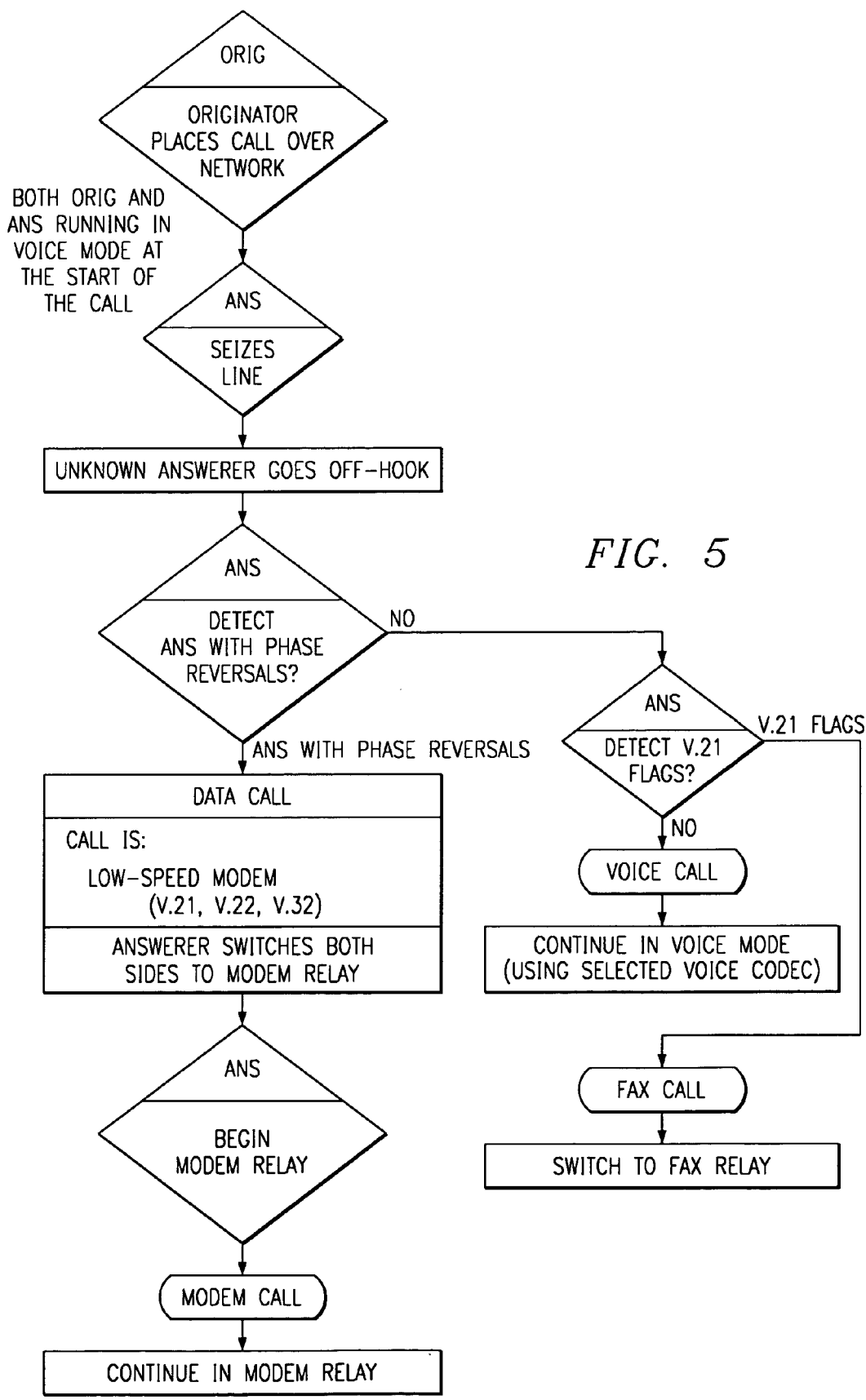
FIG. 5 is a logic diagram illustrating an alternative logic structure for modem identification and modem relay activation.

FIGS. 4 and 5 illustrate alternative embodiments for the decision tree for determining the processing sequence for new calls. Initially, the originator places a call were the packet network. Upon detecting a call, the answering gateway sees the line and goes off hook. The answering gateway then determines if a V.25 answer tone (ANS) with phase reversal, used by V.32, V.22 and V.21 modems, is present. When detected on the answering side, the gateway will switch to modem relay processing.

If phased reversal is not present, the ANS is the basic V.25 answer tone used by fax machines and V.32, V.22 and V.21 modems. When detected on the answering side, the gateway will switch to modem relay processing is the channel is preconfigured for modem relay and will not switch if the channel is potentially expecting fax transmissions. In the event that no ANS tone is detected, the answering gateway will then check for V.21 flags which is the queue to switch to fax relay processing. The if no events are detected, the gateway will to continue to process the call using voice codec.

Figure 6:
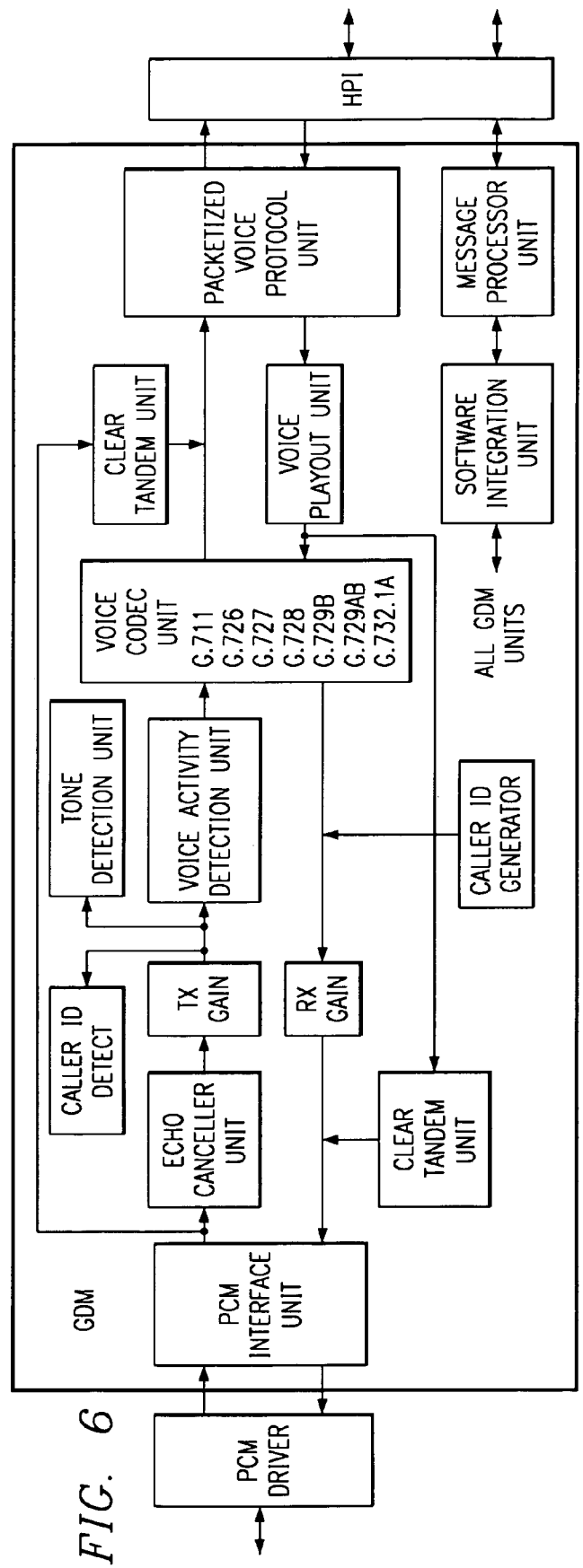
FIG. 6 is an exemplary implementation of a DSP voice channel configuration.
Figure 7:
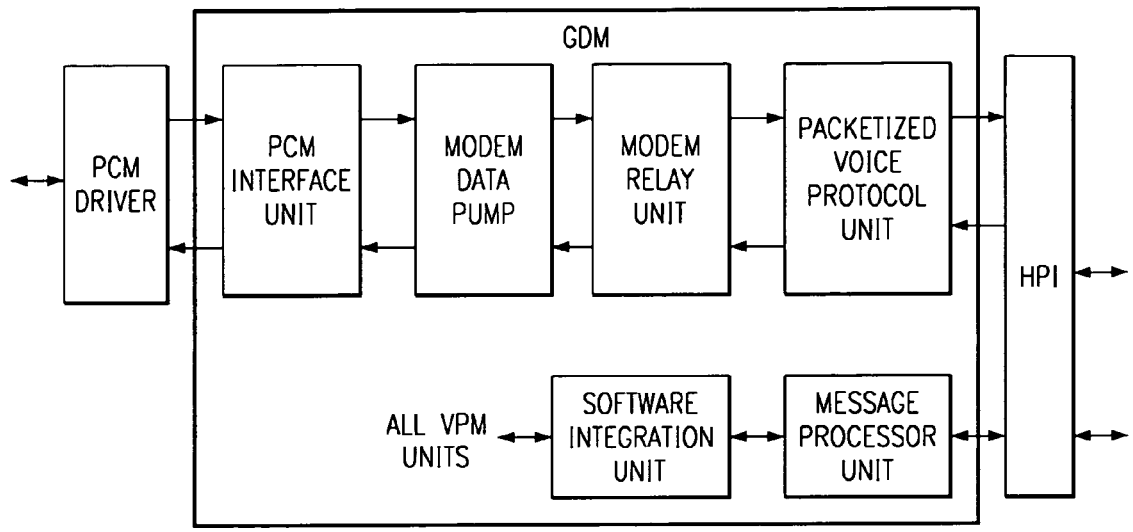
FIG. 7 is an exemplary modem relay DSP configuration.

Most of the functionality required to implement modem relay is located in the DSP software of the gateway. FIG. 6 illustrates a standard DSP voice channel configuration. When added, the modem relay unit, MRU, is added as a processing lock in the DSP software, FIG. 7. Modem relay channels are added to the DSP system integration unit SIU. Modem data pumps are added to the DSP software. Modem relay encapsulation and protocol functions are added to the MRU DSP software and MRU configuration and statistics commands are added to the SIU.

The microprocessor of the gateway also needs to be modified to accommodate the modem relay processing requirements. The microprocessor must respond to messages from the DSP that instruct the microprocessor to switch over from a voice channel to a modem relay channel in the DSP. The microprocessor must be able to respond to modem relay packets arriving from the network by switching a voice channel to a modem relay channel in the DSP. The microprocessor must allow the operator to configure and query statistics on a modem relay channels and must extend the NMM operator command set to accommodate commands needed to implement modem relay.

The SIU handles control and status messages from the microprocessor that reference to channel as it does for other types of DSP channels. Messages from the microprocessor that are unexpected or not supported in modem relay mode will be returned with an error code.

Figure 8:
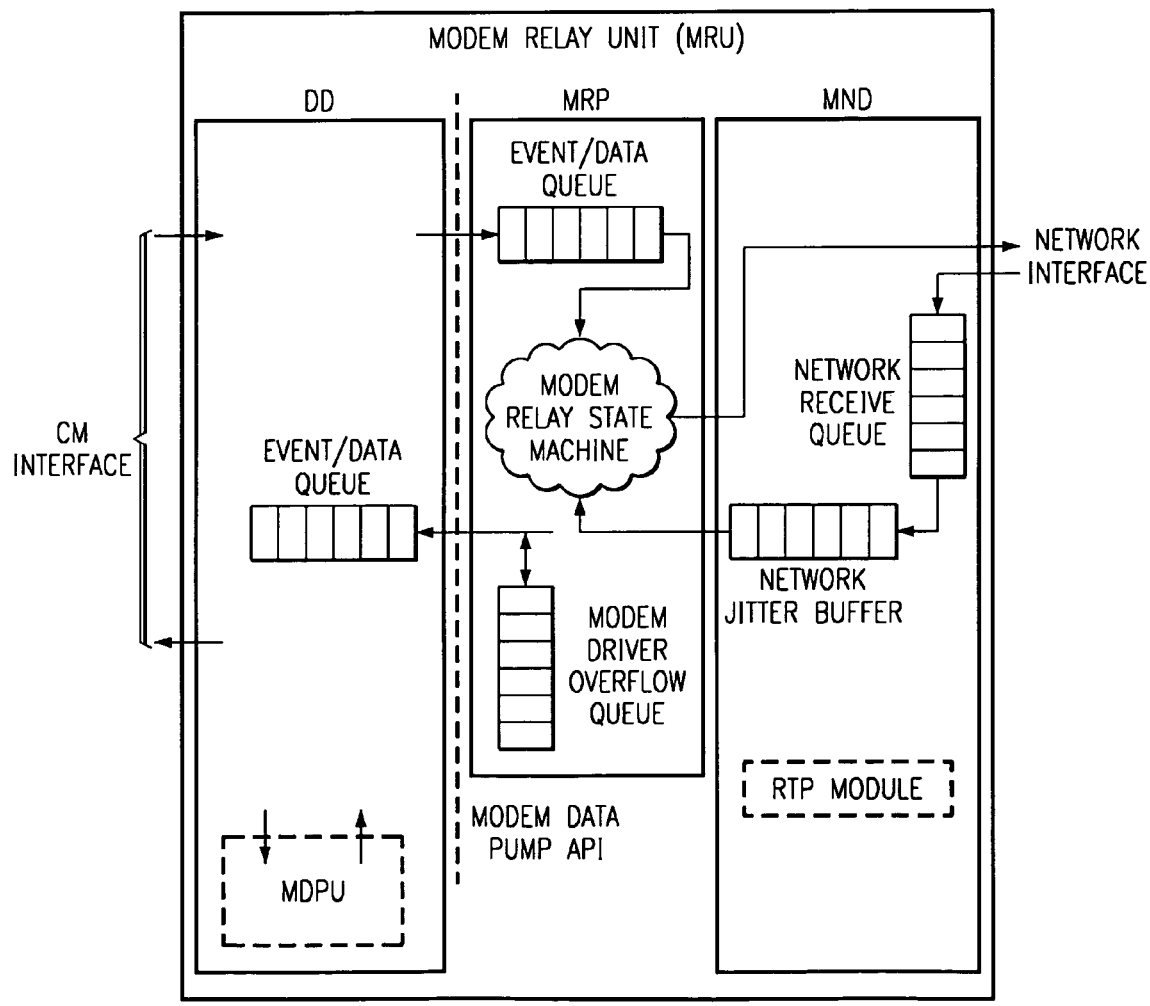
FIG. 8 is functional block diagram of an exemplary modem relay unit.

Within the MRU, FIG. 8, is the functional software for modem relay. The structure of the MRU includes a modem driver connected to the PCM interface, a modem relay protocol unit and a modem network driver which connects to the network interface. The modem driver provides the interface between the PCM interrupt routine and the modem data pump, which performs the physical modulation and the modulation functions of the current modem. The modem relay protocol module tracks the modems control and state machine functions and provides both data and messaging queues and overflow buffers. It also formats the modem data and signals into the proprietary modem relay protocol. The modem network driver performs the RTP encapsulation functions to implement the modem relay protocol containing signaling messages and data. It also provides a jitter offer to compensate for network delays.

Figure 9:
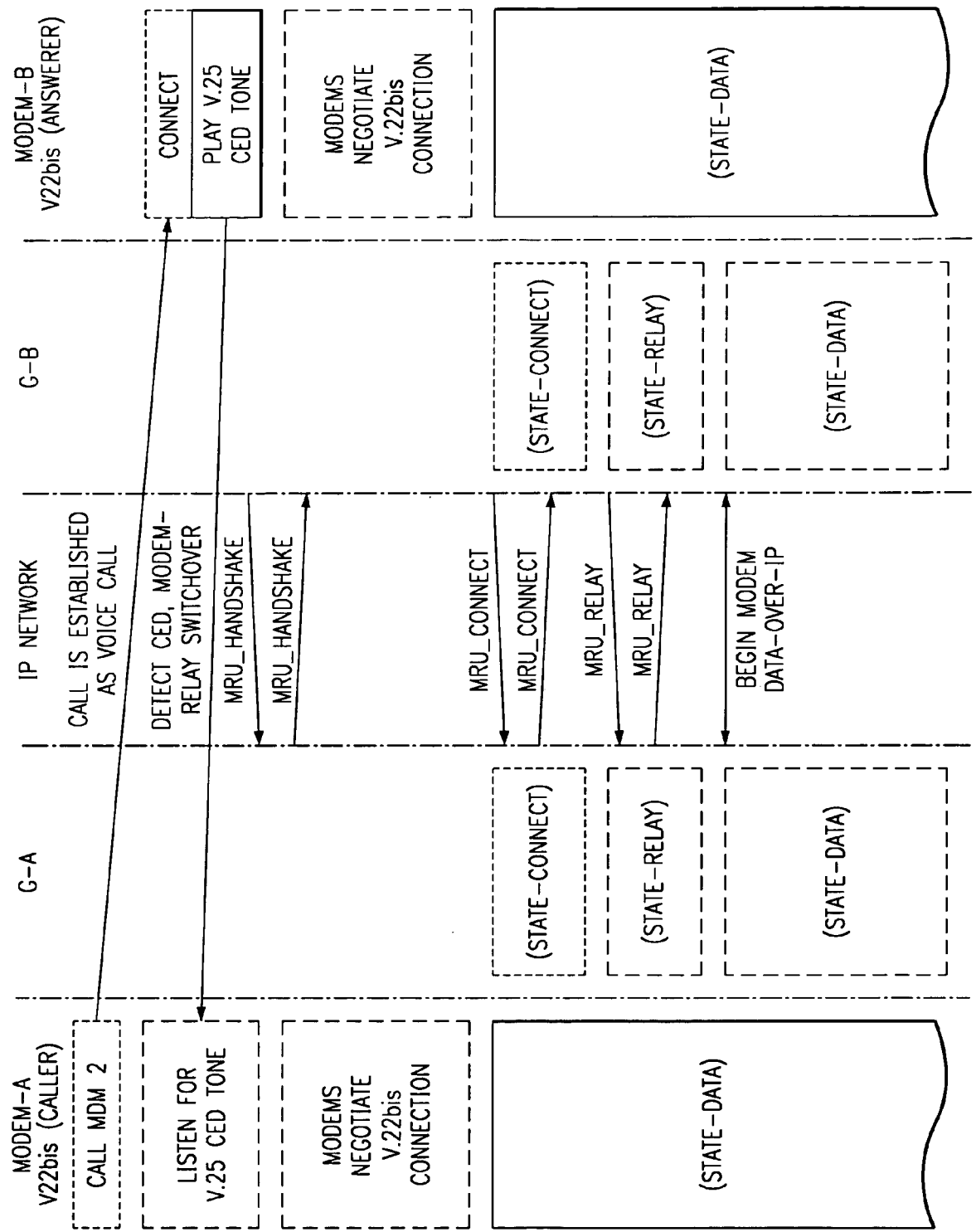
FIG. 9 is a ladder diagram illustrating the establishment and negotiation of a connection using V.22 bis modems.

The establishment and negotiation of a connection using V.22 bis modems is illustrated in the connection ladder diagram of FIG. 9. The modems will establish and negotiate a connection between the two gateways using the gateway communication messages to coordinate the modem sessions. As illustrated, the call is initially established as a voice call until the tones to establish modem relay are detected. The modem relay units exchanged a handshake, and appropriate connection is negotiated the modem relay units contact and then establish relay states for beginning the modem data over IP communication.

Figure 10:
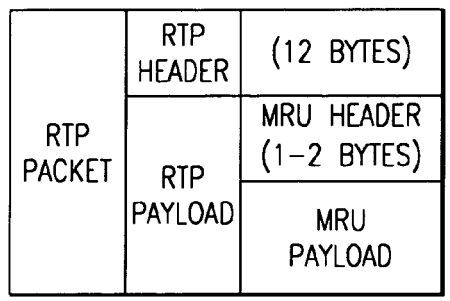
FIG. 10 illustrates a typical IP packet for the present invention.

In order to properly implement a modem relay, is necessary to establish packetization parameters as well as modem functional parameters such as modulation and rate. The approach of present invention defines the modem relay unit packet format to be encapsulated by RTP packets for use by compatible gateways with modem relay units. In order to establish and maintaining a modem connection over a packet network, the originating an terminating gateways must have a common modem relay unit packet format. The packet, FIG. 10, transported over the digital packet network, consists of a sequence number, kind stand, modem handshake, modem relay protocol and modem data depending on the process modem relay state. The packet format is illustrated in FIG. 10.

Figure 11:
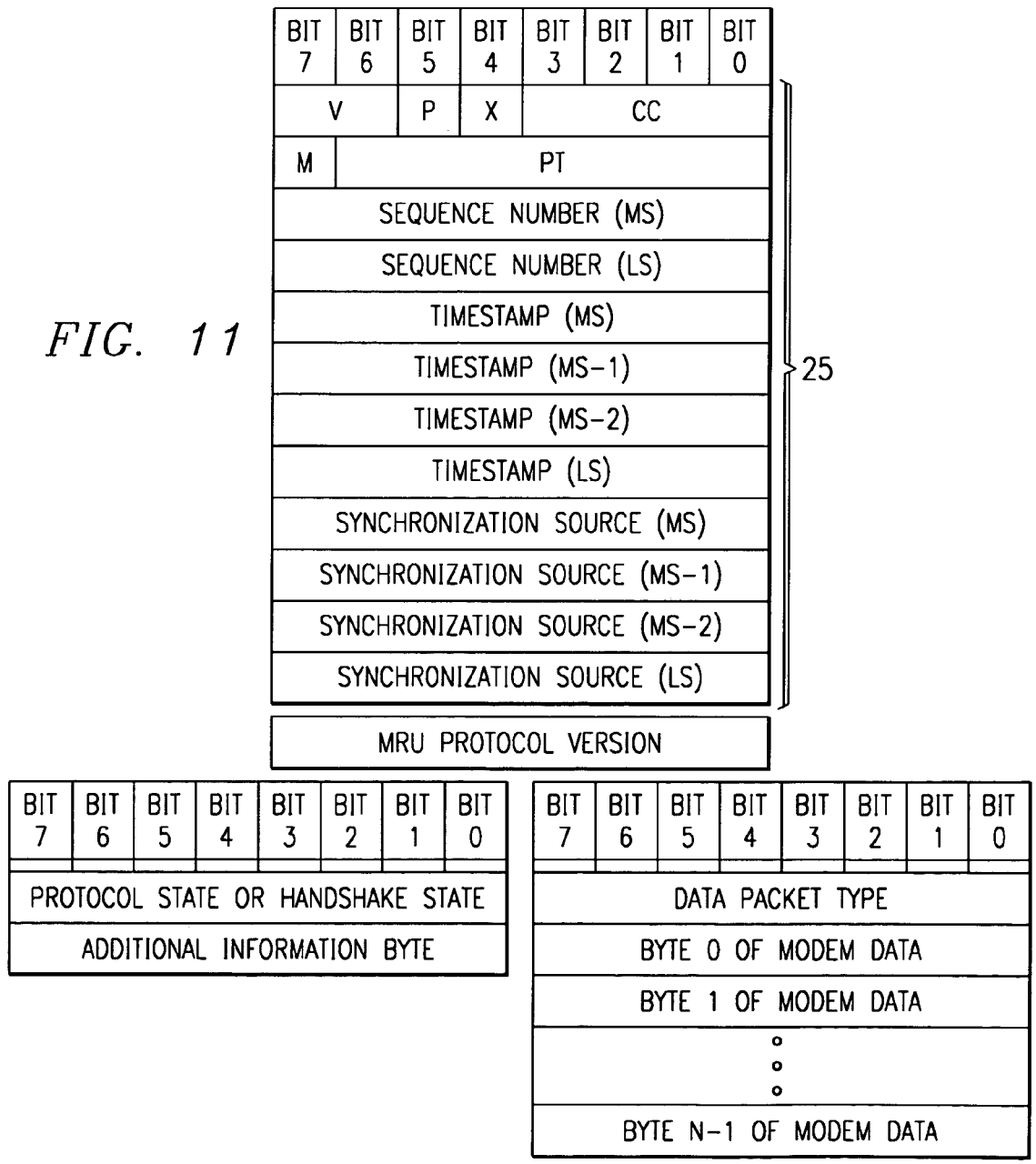
FIG. 11 illustrates an exemplary MRU packet format of the MRU payload within the RTP packet of the present invention.

FIG. 11 illustrates the MRU packet format of the MRU payload within the RTP packet. The illustrated exemplary embodiment illustrates and a bit payload with redundancy. Because the modem relay unit the present invention maintains the modem connection with the modem at each end of the connection, the data can be packetized into a packet with a standard RTP header and time stamp. The following the RTP header, blocks 25 in FIG. 11, is a field indicating the MRU protocol version. Identification of protocol version allows for better capabilities match and backward compatibility for more recent protocols. The digital fields in the packet include protocol state packets, handshake state packets and data as the exemplary packets in the present invention. Other protocols said packets can be included. The modem relay protocol state packets, modem handshake state packets end modem data packets are illustrated in FIG. 12.

In addition to establishing protocols for packetization, protocols for a method for established communication across a packet network between modem relay units, must also be established. Once a call is established across a network was acceptable network delay and packet loss in the modem data pumps of the modem relay units begin the handshake routine two from the respective local modems. The modem data pumps are also able to report local connection and cure loss information to the modem.

Once a call is established across a network, both modem relay units send a modem relay handshake message packets to the other modem relay unit. The initial packet contains the information of supported a modem rates. The need is repeated every 50 milliseconds to overcome packet losses. As soon as the first message is sent over the network, a timer is set to 5 seconds and started. The modem data pumps are maintained a idle during the handshake phase.

The MRU's send handshake message packets to each other. The packet contains information of supported modem rates as bit maskes. The message is repeated every 50 milliseconds to overcome packet losses. As soon as the first message is sent over the network, a timer is set to 5 seconds and started. The modem data pump is maintained off. When the handshake message is received the rate bit mask is added with the local rate bit mask. The highest speed is chosen from the resulting value and handshake is initiated with the local modem. The modem data, will be started and connected at the best possible data rate.

If the handshake message is not received, then the timeout occurs and highest speed is chosen from the local rate bit mask. The hand shake is initiated with the local modem and the modem data pump is started.

As soon as a local handshake is reported, the modem relay unit will send the connect message packet to the other side. This message is also repeated every 50 milliseconds to overcome packet losses. When the connect message is received, the receiving MRU sends the reply message packet to the other site and continues to communicate with data packets. In the reply message is for acknowledgment purposes and is not repeated. When a carrier loss occurs, the modem relay unit will send the carrier loss relay message packet to the other side. This message is repeated every 50 milliseconds to overcome packet losses. When the MRU connect message is received, the MRU sends the MRU relay message packet to the other side and continues to communicate with data packets. This message is for modem purposes and will not be repeated.

When the MRU connect message in received, the MRU sends the MRU relay message packet to the other side, and continues to communicate with data packets. When a carrier loss occurs, the MRU will send the carrier loss message to the other side. When a user intervenes to stop the MRU the offline message is sent to the other side. In either the offline or the carrier loss message is received, the MRU will stop the data pump and inform the user.

The efficiency of transport of packets over a packet network for a modem relay of the present invention can be affected by number of factors. The present invention teaches a system for measuring the throughput efficiency of a V.22bis modem relay transmission over a packet network, FIG. 13. In order to perform the method of determination as taught herein.

In order to practice the method for measuring throughput efficiency taught in the present invention, each gateway in the connection utilizes a modem relay unit as taught in the present invention to connect its local modem to the network. The throughput efficiency can be measured after the modems have negotiated the appropriate protocols and have passed to the stage where a steady-state connection over the packet network is established.

Figure 13:
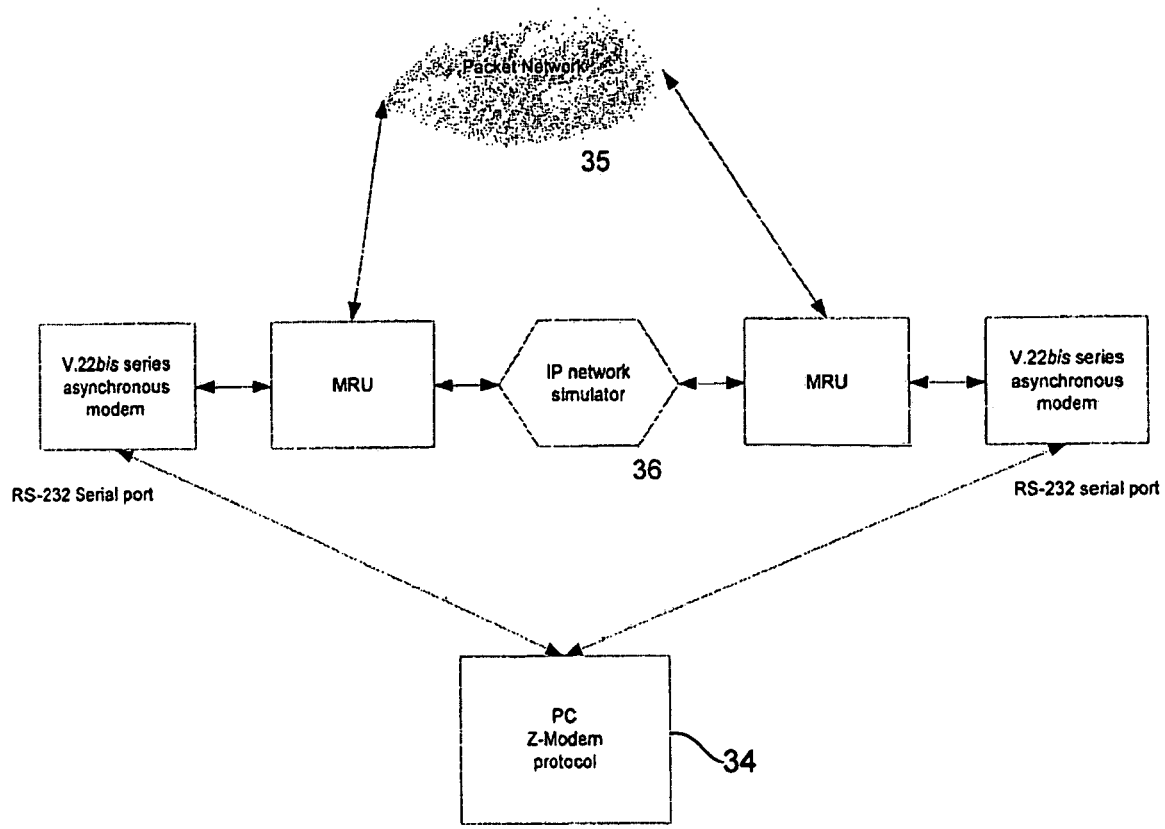
FIG. 13 is a block diagram illustrating a system for measuring the throughput efficiency of a modem relay transmission over a packet network.

A computing device 34, as illustrated in FIG. 13, is connected to each of the two modems. The connection can for example be through a standard serial or parallel port to receive information from each of the modems. The computing device 34 runs two terminal programs, one for each modem. Each terminal program runs a Z-modem protocol and generates a modem data stream at a known throughput rate. The computer 34 is aware of the generated rate at each end of the modem relay communication and the received rate and can assess the throughput rate by comparing the modem data stream generation rate to the modem data stream reception rate.

If the throughput efficiency measurement method is used across an existing network 35, the analysis will provide an indication of the throughput across that network. However, a network simulator 36 can be utilized in place of an actual network. The use of a network simulator 36 allows for control of parameters such as packet loss and delay for evaluation of modem relay implementation. For example, the simulator 36 can vary packet loss to any desired percentage. The simulator 36 can also vary packet delay to any desired delay time. The network simulator can also provide uniform distribution of packet loss and/or delay or can provide randomly distributed loss and delay.

When implemented using a network simulator, the modem relay throughput efficiency measurement method of the present invention can be used to evaluate different software algorithms within an MRU of a gateway while maintaining fixed network conditions to provide a common reference. Measurement of throughput efficiency under fixed network conditions allows for implementation of appropriate redundancy techniques which minimize the loss of connection and the need for retrains while maximizing throughput by reducing excess redundancy.

In evaluating the throughput efficiency, a number of files are transferred across the MRU's using the terminal program and Z-modem protocol of the computing device 34. The average throughput after a series of iterations of file transfers is a logged for each file type and an overall throughput efficiency is determined. For example, a set of files such as the following could be used for testing and evaluation.

An ASCII file with ASCII characters only, a C source file, a combination composed of equal portions of repetition, ASCII, random and a section of continuous blanks, a valid DOS executable program file, a file of repeated ASCII sentences, a valid ASCII graphic (AutoCAD) file, a random binary file, and/or a valid spreadsheet file.

Figure 14:
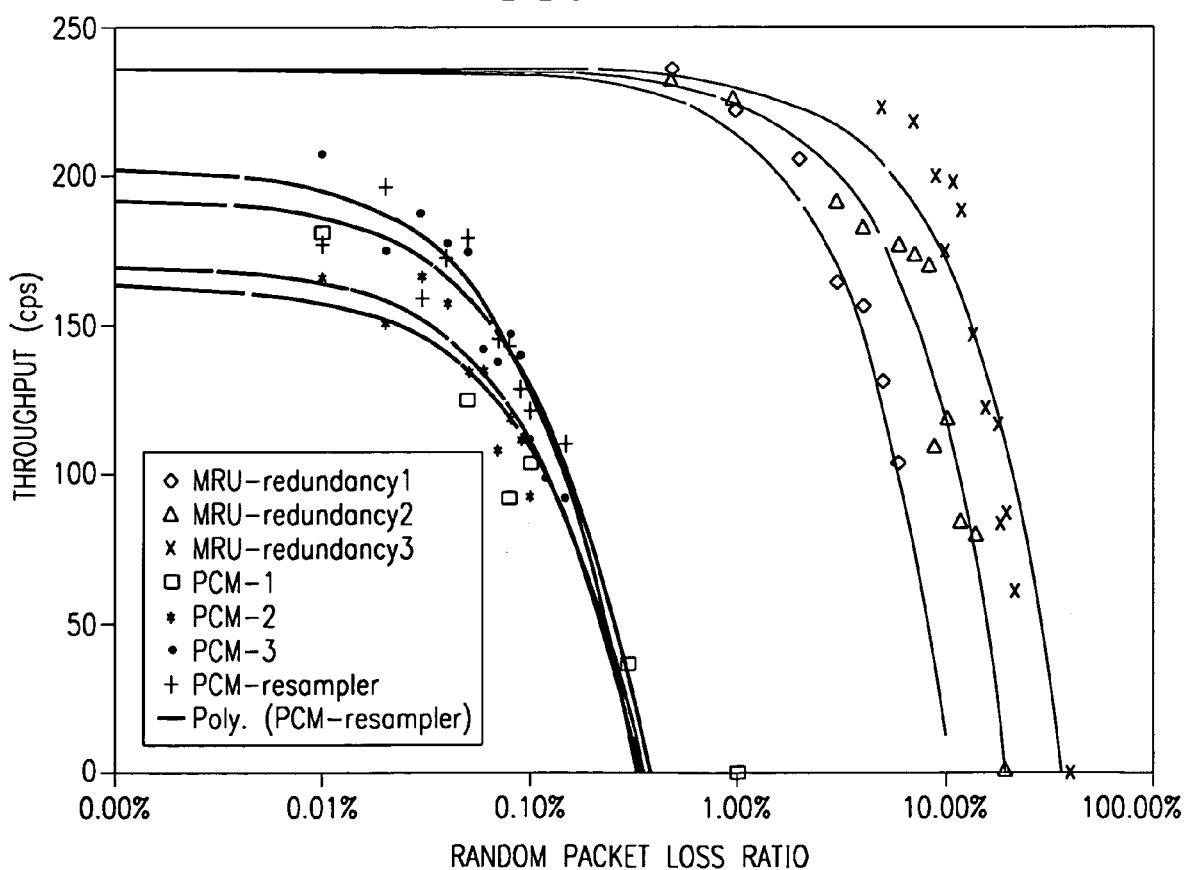
FIG. 14 is a graph of packet loss and/or delay with respect to throughput as determined by the throughput analysis technique taught in the present invention.

In an exemplary embodiment, each file length is 42 kB and length. The file length illustrated is for exemplary purposes, in any given implementation of the invention, the file length can be any appropriate size. The Z-modem file transfer protocol throughput values are collected and the average of the collected values is calculated. Two tables are prepared with the x-axis as packet loss or delay and the y-axis as throughput, FIG. 14. The designer can then select the best tradeoff of packet loss and delay in designing a modem relay system.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

We claim:

1. Apparatus for measuring the efficiency of transport of modem relay packets over a packet network, comprising:
   a first means for connecting to a first gateway of said modem relay connection;
   a second means for connecting to a second gateway of said modem relay connection;
   a computing device, operably connected to each of said first connecting means and said second connecting means through a network,
      for running at least one terminal program for at least one of said gateways after a steady-state connection has been established between said first means and said second means;
      for providing a reference modem data stream at a known modem stream generation rate to at least one of said gateways,
   wherein said reference modem data stream has at least one digital file that is independent from setup and protocol files for said first and said second means; and
      for receiving a transported modem data stream at a modem stream reception rate from a second one of said gateways after said reference modem data stream has passed through said gateways and said packet network; and
   means for determining the transport efficiency of said packet network by comparison of said known modem stream generation rate of said reference modem data stream to a determined throughput rate of said received modem data stream.

2. The apparatus of claim 1, wherein:
   said terminal program runs a Z-modem protocol for generating said modem data stream at a known generation rate.

3. The apparatus of claim 1, wherein said computing device:
   runs a terminal program for each of said gateways;
   provides a reference modem data stream at a known generation rate to each of said gateways;
   receives a transported modem data stream from each of said gateways after said reference modem data stream has passed through said gateways and said packet network; and
   determines the transport efficiency of said packet network by comparison of said known generation rate of said reference modem data stream to said determined throughput rate of said received modem data stream.

4. The apparatus of claim 1, wherein said throughput efficiency is measured after said gateways have negotiated appropriate protocols over said packet network.

5. The apparatus of claim 1, wherein said modem relay connection is established across a network.

6. The apparatus of claim 1, wherein said modem relay connection is established across a network simulator.

7. The apparatus of claim 6, further comprising:
   means for control of network transport parameters of said network simulator.

8. The apparatus of claim 7, wherein said controlled parameters include packet loss and packet delay.

9. The apparatus of claim 8, wherein said parameters can be varied to selectively simulate uniform distribution of packet loss and random distribution of packet loss.

10. The apparatus of claim 7, further comprising:
    means for providing alternative packet protocol algorithms to at least one of said gateways and measuring comparative throughput efficiency while maintaining fixed network conditions to provide a common evaluation reference.

11. The apparatus of claim 1, wherein:
    said determination of said transport efficiency includes at least two iterative repetitions of said provision of said reference modem data stream and said reception of said transported modem data stream and said comparison of said known generation rate of said reference modem data stream to said reception rate of said received modem data stream; and
    wherein said determination is based upon the average efficiency determined after a series of said iterations.

12. A method for measuring the efficiency of transport of modem relay packets over a packet network, comprising:
    providing a reference modem data stream at a known generation rate to a first one of a plurality of gateways of a modem relay connection;
    receiving a transported modem data stream from a second one of said gateways after said reference modem data stream has passed through said gateways and said packet network; and
    after a rate negotiation and a steady-state have been reached between said gateways, comparing said known generation rate of said reference modem data stream to said determined throughput rate of said received modem data stream by fixing network conditions and varying one or more network conditions while transmitting a digital file as said reference modem data stream, to determine a network transport efficiency.

13. The method of claim 12, further comprising:
- collecting a group of data representative of the network throughput efficiency under a number of network conditions and corresponding to a plurality of known file transfer protocols;
- determining the network throughput efficiency values corresponding to the plurality of file transfer protocols and determining the average rate for a given protocol with given network conditions; and
- generating a representation indicative of the relationship between modem relay system design and packet transport efficiency across said network.

14. A method to measure throughput efficiency of low speed modem relay over packet networks, comprising:
- establishing a modem call over a modem relay system between a first modem to a second modem over a network through a modem relay system comprising a first gateway, connected locally to said first modem, and a second gateway, connected through a packet network to said first gateway and connected locally to said second modem;
- transmitting a demodulated data stream of said modem call over said packet network;
- establishing a steady-state connection over the packet network;
- generating a plurality of reference modem data stream throughput rates of a first file type by repeatedly transmitting said first file type across from said first gateway to said second gateway as said reference modem data stream,
- wherein said first file type is independent from setup and negotiation protocols of said modems and said gateways;
- measuring a first modem data stream reception rate during said modem call by determining an average throughput rate of said first file type;
- repeating said generating and said measuring for a second file type,
- wherein said second file type is independent from setup and negotiation protocols of said modems and said gateways; and
- measuring throughput efficiency of said modem relay by comparing said average modem data stream reception rates with said reference modem data stream generation rates.

15. The method of claim 14, wherein said measuring and said repeating are performed on both said first gateway and said second gateway and a comparison of said measuring from both said gateways are used to determine said throughput efficiency.

* * * * *